INVENTOR.
Robert R. Crookston,
BY

AGENT

United States Patent Office 2,751,183
Patented June 19, 1956

2,751,183
MULTIPLE PISTON OPERATED MUD VALVE

Robert R. Crookston, Houston, Tex., assignor, by mesne assignments, to Esso Research and Engineering Company, Elizabeth, N. J., a corporation of Delaware Application October 23, 1952, Serial No. 316,396

4 Claims. (Cl. 251—31)

The present invention is directed to a by-pass valve. More particularly, the invention is directed to a by-pass valve suitable for use in drilling mud circulating systems. In its more particular aspects, the invention is directed to a by-pass mud valve which is designed to open and close and effect a positive seal.

The present invention may be briefly described as involving a mud valve which comprises a housing provided with a wall member defining with said housing first and second chambers having an inlet and an outlet for the first chamber. Arranged in the first chamber is a first piston which is adapted to open and close the inlet and outlet. Connected to the first piston is a piston arm which protrudes through an opening in the wall member into the second chamber. A second piston is arranged in the second chamber and is connected to the piston arm. The second chamber is provided with separate means for supplying operating fluid on each side of the second piston for moving the second piston in two directions in the second chamber and thereby opening and closing the inlet and outlet by actuation of the first piston.

It is required, in the device of the present invention, that the first chamber be provided with an annular recess defined by the housing which is adapted to receive an annular packing member. The annular recess communicates with an exterior surface of the housing and with a source of pressure lower than a pressure in the first chamber defined by the housing. Arranged in the recess is a deformable annular packing member defining a cylindrical surface and having a vertical circular cross-section slightly greater than the depth of the recess. The first piston is arranged to move into contact with the packing member and to form a seal therewith. The arrangement of the recess with a passageway communicating with a source of pressure lower than that of the pressure in the first chamber allows a seal to be effected without the annular packing member being pulled out of the annular recess when the first piston moves into contact with the packing member or engages or disengages therewith.

It is also contemplated that the valve of the present invention will include in a second chamber a third piston which is arranged therein in free relationship to the second piston. The third piston is not connected to the second piston but is provided with a guide means which is slidably arranged in the housing to allow movement of the third piston against the second piston and to move the latter.

The first piston and the piston arm may be constructed integrally and it is contemplated that the first piston and the piston arm may define therewith a cental bore allowing communication of the area in the first chamber ahead of the first piston with the second chamber and the space between the second and third pistons.

The invention will be further illustrated by reference to the drawing in which

In the several figures of the drawing, identical numerals will designate identical parts.

Figure 1A:
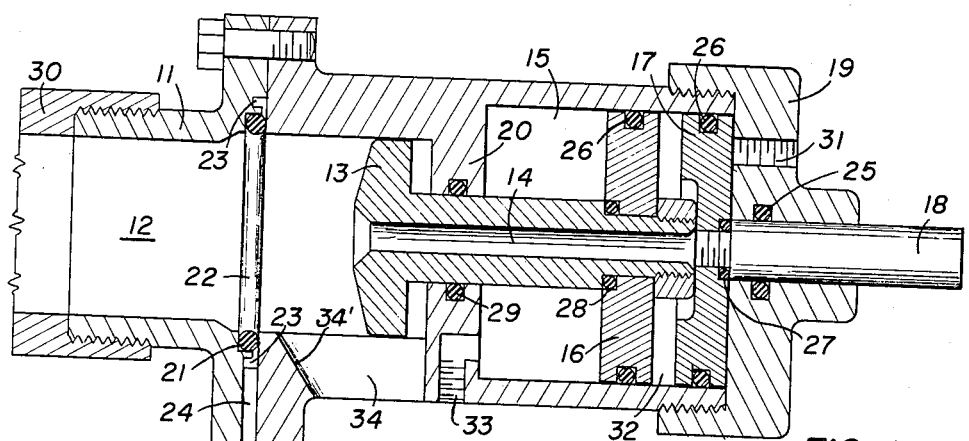
Fig. 1a is a sectional view of a by-pass valve embodying the present invention showing the valve in the open position.
Figure 1B:
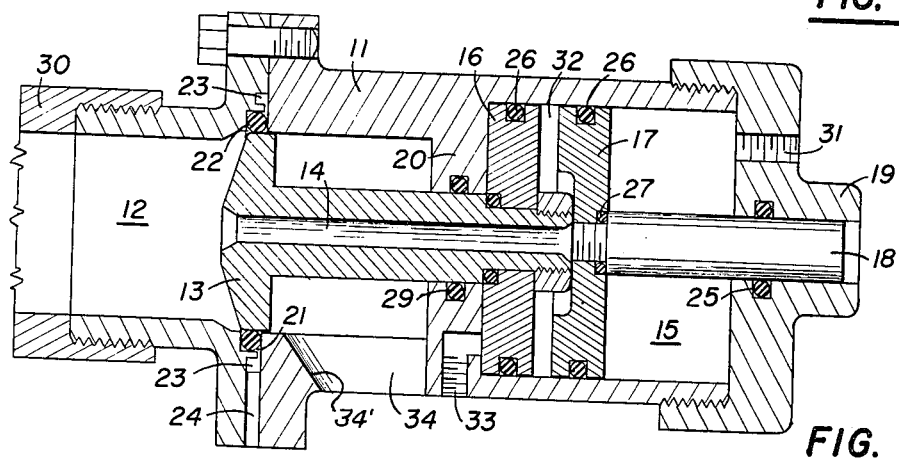
Fig. 1b is a similar view of the by-pass valve of Fig. 1a embodying the present invention with the valve in the closed position showing the seal effected thereby.

Referring now to Figs. 1a and 1b, numeral 11 designates a valve housing defining a central passageway 12 in which is arranged a piston shaped member 13. Piston member 13 is bored to form a passageway 14 and is adapted to slide in the central passageway 12. Housing 11 defines a chamber 15 in which is arranged a pair of pistons 16 and 17. Piston 17 is threadably engaged with a guide rod 18 which slidably fits through a closure 19 of housing 11. Piston 13 makes a sliding fit with wall member 20 of housing 11 which defines, with closure 19, chamber 15. Housing 11 defines a rectangular recess or groove 21 in which is arranged an annular packing member or O-ring 22 which may be constructed of deformable rubber, either natural or synthetic, plastic, an elastomer, or any other material which has tendency to extrude and flow under pressure. Recess 21 is in fluid communication with a collector groove 23 which in turn fluidly communicates with a passageway 24 defined by housing 11 and which opens to the atmosphere or to a source of low pressure. Central passageway 12, at its open end, is in fluid communication with a source of high pressure substantially above atmospheric or the source of pressure with which passageway 24 is in communication.

The guide rod 18 is provided with suitable conventional packing rings 25 to insure a seal thereof and the pistons 16 and 17 are similarly provided with packing rings 26, 27, and 28 to insure proper sealing thereof. Member 20 is also provided with a packing ring 29 to insure a seal between piston 13 and member 20.

Figure 2:
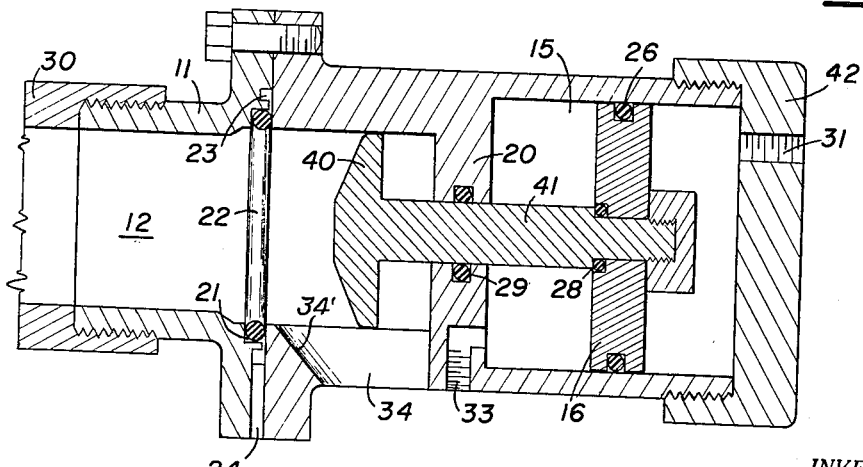
Fig. 2 is a modification of the embodiment of Figs. 1a and 1b.

Referring now to Fig. 2, it will be seen that this is a modification of Figs. 1a and 1b in that the piston 17 has been eliminated with its allied parts, such as guide rod 18. Furthermore, it will be seen that the piston 13 of Figs. 1a and 1b has been replaced by the piston 40 to which is attached piston 16 by piston arm 41. It will be further noted that piston 40 and piston arm 41 are not provided with a central bore such as bore 14 of Figs. 1a and 1b.

With the elimination in Fig. 2 of the piston 17 of Figs. 1a and 1b the closure 19 of Figs. 1a and 1b has been replaced by the closure 42 of Fig. 2. This closure 42 is provided with an air inlet 31 defined by closure 42 and the chamber 15 is provided with an air inlet 33. These parts are identical to the parts of Figs. 1a and 1b and function in a similar manner.

The device of Figs 1a and 1b may be connected a conduit 30 connected to a source of high pressure fluid, such as mud, under pressure in the range between 300 and 3000 p. s. i. g. Assuming that a stream of mud is flowing through conduit 30 into central passageway or chamber 12 and it is desired to close the valve embodying the apparatus, air under pressure would be admitted into the apparatus by way of a conduit, not shown, connected to air inlet 31 defined by closure 19 which would force piston 17 against piston 13 which would cause the piston 13 to move against the flow of mud fluid in central passageway 12. As piston 13 moves in central passageway 12, bore 14 would be filled with mud and mud would fill the space 32 between pistons 16 and 17. Piston 13 then moves into contact with annular ring 22 forming a seal therewith. Provision of a bore 14 allows the piston 13 to be moved easily to the left since the mud in chamber 12 in the path of piston 13 is displaced through bore 14 into the space between pistons 16 and 17. When the piston 13 is to be moved to the right, air pressure is exerted against piston 17 through port 33 which displaces the mud in the space between pistons 16 and 17 into chamber 12.

Provision of the two pistons 16 and 17 also serves to allow the piston 13 to be held against or in contact with sealing member 22 by mud pressure exerted through bore 14 against piston 16 which has a working area greater than that of piston 13. Thus, after air pressure exerted against piston 17 has moved piston 13 in contact with seal member 22 to close the valve, mud pressure holds the valve closed. Pistons 16 and 17 in cooperation with bore 14 thus provide an easily openable and closeable valve and one that is maintained closed by mud pressure. In other words, this is a self-closing feature. The pressure of mud in central passageway 12, however, would cause the O-ring or annular member 22 to remain in the recess or groove 21 since the force would be asserted diagonally across the packing member and make the deformable packing ring seek to escape from its confinement through the groove 23 and passageway 24 since this passageway communicates with a source of pressure lower than that of the mud fluid. A positive seal would therefore be obtained.

When it is desired to open the valve defined by the apparatus shown in Figs. 1a and 1b, air or other gas under pressure would be admitted to inlet 33 defined by housing 11 and member 20 into chamber 15. This pressure would work against piston 16 which in turn would move it toward piston 17 causing the mud in chamber 32 to be forced out through bore 14 into the central passageway 12 as piston 13 is moved backward by the force applied against piston 16; the outlet 34 would again be opened allowing the mud fluid to pass into central passageway 12 by conduit 30 and outwardly therefrom by outlet 34 having a leading sloping surface 34' allowing unimpeded passage of mud. As piston 13 moves into contact with recess 21 containing annular member 22 it would tend to pull the annular member 22 from its groove if the principle embodied in the present invention did not serve to maintain the packing member 22 in place. Thus the deformable material or rubber would tend to flow from the recess following the piston 13, but the pressure exerted by the mud fluid in central passageway 12 is opposing this shearing force since the fluid and also the annular member 22 seek to escape by groove 23 and passageway 24 communicating with a source of low pressure. This opposing force effectively prevents the annular packing member from being pulled out from its recess 21 and thus being destroyed. The O-ring 22 effects a seal while the piston 13 is being withdrawn, resulting in a snap action like that in popping open a bottle of champagne. Thus the forces to which the annular member is exposed would tend to cause it to be compressed or decreased in volume in view of Bournelli's theorem. Bournelli's theorem is simply that, neglecting friction, the total energy in a stream of fluid in any one direction remains constant; therefore, when fluid flows through a restriction its velocity is increased; its kinetic energy is increased at cost, however, to the potential energy. Stated more simply, the theorem is that where the velocity is greatest the pressure is least. Thus, in the device of the present invention in which a male plug is employed with a female O-ring to provide a seal and in which the male plug is removed, the superfluous pressure is released at the point of breaking the seal and the potential energy is converted to velocity energy and any positive pressure built up in the O-ring in the annulus containing it tends to compress the O-ring which by nature of the material of construction it cannot do and thus causes it to extrude very violently through any section of the opening in which there are plus or minus differences in kinetic energy. This phenomena is regularly suffered in arrangements in the prior art such as a valve body with an outlet in one direction only which is not symmetrical. In the present invention, however, the forces tending to eject the O-ring from its recess are overcome by allowing forces to be exerted diagonally across the O-ring tending to cause the O-ring to be extruded or seek to be extruded through the passageway communicating to a pressure source lower than that of the pressure source exerted against the annular packing member. It will be seen, therefore, from the foregoing description of the operation of the device of Figs. 1a and 1b that an improved sealing device has been described which allows a positive seal at all times which obviates dangers of the sealing member being pulled from a sealing position and destroyed.

The device of Fig. 2 operates similarly to the device of Figs. 1a and 1b. Thus like in Figs. 1a and 1b the conduit 30 may be connected to a source of drilling mud under a high pressure, such as a pressure in the range between 300 and 3,000 p. s. i. g. As the stream of mud flows through the conduit 30 into chamber 12 and it is desired to close the valve, air under pressure would be admitted into the valve by way of a conduit, not shown, connected to inlet 31 defined by the closure 42 which would force piston 16 to the left and would cause the piston 40 to move against the flow of mud fluid in chamber 12. As the piston 40 moves into chamber 12, the mud ahead of it would be displaced and the piston 40 would move into contact with the annular ring 22 forming a seal therewith. The pressure of mud in chamber 12, however, would tend to cause the O-ring or annular member 22 to remain in recess or groove 21 since force would be asserted diagonally across the packing member and make the deformable packing member seek to escape from its confinement through the groove 23 and passageway 24. Since this latter passageway communicates with a source of pressure lower than that of the mud fluid, a positive seal would be obtained.

When it is desired to open the valve, air or other gas under pressure may be admitted to inlet 33, by a conduit not shown, defined by the housing 11 and the wall member 20 into chamber 15 ahead of the piston 16. This pressure works against piston 16 and would move it to the right causing the air back of the piston 16 to be forced out through the passageway 31. The outlet 34 would be again opened allowing mud fluid to pass into chamber 12 by conduit 30 and outwardly therefrom by outlet 34. As the piston 40 moves in contact with recess 21 containing annular member 22 it would tend to pull the annular member 22 from its groove if force were not asserted across the annular member 21 by the mud pressure in chamber 12. Otherwise the annular member 22 would tend to flow from the recess following the piston 40. Thus in accordance with this modification of the device of my invention a positive sealing effect is obtained. The valve is either in the completely open or closed position.

It is to be understood that when operating fluid is being admitted by inlet 31 in the case of Fig. 2, air or operating fluid admitted by inlet 33 would be forced outwardly through inlet 33 and released through means not shown. The same applies when air or gas is admitted by inlet 33; in this case, the air admitted by inlet 31 would be forced out therethrough and also released through means not shown.

It may be noted with regard to the two embodiments of the drawing that piston 13 has a working area less than that of the working area of pistons 16 and 17 and that the working area of the piston 40 is less than that of the piston 16. It is possible, therefore, to overcome the mud pressure asserted on pistons 13 and 40 by air pressure less than that of the mud pressure.

The invention has been described and illustrated with one passageway communicating the recess with a source of lower pressure. It is to be understood that this passageway may be a plurality of passageways. In fact, it is preferred that a plurality of passageways be employed such that the O-ring or deformable annular packing member will seek to be extruded through the plurality of passageways and thus be held snugly in the groove or recess provided for it. It will be seen that positive forces are trying to extrude the O-ring to the outside of the valve housing via the weeping annulus or bleeder holes which means the O-ring is always held in place. When the seal is about to be broken as described and illustrated by the first piston member, these forces, explainable by the phenomena related to Bournelli's theorem, tend to cause the rubber O-ring to stretch, changing it from approximately circular cross section with little or no pressure on it to a rather elongated ellipse, the degree depending upon the differential pressures involved. The major axis of the O-ring extends from the weeping annulus to the escape annulus. The fact that the O-ring is under tension and distorted from circular cross section to elliptical, causes the ring to snap back into place by effect of the force of higher pressure across the O-ring, causing it to seek to escape through the weeper holes. The ring is under tension and distorted from circular cross section to elliptical, causing it to snap back into place so that the rate of effective opening depends not only on the rate of piston travel but also on the rate of spring back of the O-ring itself. This snap action action actually reduces the total abrasion suffered by the O-ring and seat material in applications such as described with respect to Figs. 1a and 1b where the surfaces are in contact with abrasive fluid, such as mud.

When the first piston is closing and is about to enter the locus of the O-ring, negative or zero pressures exist (again explainable by Bournelli's theorem) and the O-ring tends to jump up to meet the piston, thus also affording an increase in the rate of closure with a benefit similar to that attained in snap action opening, namely, reduction in abrasion. These fast openings and closings minimize erosion of the metallic and rubber parts and are important advantages in the handling of abrasive materials, such as drilling mud.

Thus, from the foregoing discussion it will be seen that it is impossible for the first piston to shear the O-ring by impinging it against the edge of the opening annulus. Hence the forces opposing the O-ring to leave this recess overcome the tendency of the forces striving to remove the O-ring from the recess. In short, the pressure from the high pressure source seeks to escape to the low pressure source and this causes the O-ring to remain in its groove designed for that purpose.

The valve of the present invention is advantageous in that it forms a positive seal and in that it is either in the open or shut position and will allow the by-passing of abrasive fluids, such as drilling mud, with minimum erosion of exposed parts.

This application is a continuation-in-part of Serial No. 108,737, entitled Valve Sealing Device, filed August 5, 1949, for Robert R. Crookston, which matured into Patent No. 2,722,402 on November 1, 1955.

The nature and objects of the present invention having been completely described and illustrated, what I desire to claim as new and useful and to secure by Letters Patent is:

1. A mud valve which comprises a housing provided with a wall member defining with said housing first and second chambers having an inlet and outlet for said first chamber, a seating surface provided by said housing in said first chamber between the inlet and outlet, said inlet having a common longitudinal axis with said first chamber and said outlet being arranged in said housing downstream from said seating surface and having its longitudinal axis perpendicular to the longitudinal axis of the inlet for smooth and uninterrupted flow of mud from the inlet to the outlet through said chamber, a first piston arranged in said first chamber adapted to close and open said inlet by slidable movement along the longitudinal axis of the first chamber into and out of contact with said seating surface, a piston arm connected to said first piston protruding through an opening in said wall member into said second chamber, said first piston and said piston arm being provided with a central bore communicating the first chamber ahead of said first piston with the second chamber for flow of mud into said second chamber on movement of said first piston to close the inlet, a second piston in said second chamber rigidly mounted on said piston arm intermediate its ends, a third piston in said second chamber on the side of said second piston remote from said first piston and in slidable free relationship to said second piston, and separate means for supplying clean operating fluid to the opposite ends of said second chamber for moving said second and third pistons in said second chamber and thereby closing and opening said inlet by actuation of said first piston.

2. A mud valve which comprises a housing provided with a wall member defining with said housing first and second chambers having an inlet and an outlet for said first chamber, a seating surface provided by said housing in said first chamber between the inlet and outlet, said inlet having a common longitudinal axis with said first chamber and said outlet being arranged in said housing downstream from said seating surface and having its longitudinal axis perpendicular to the longitudinal axis of the inlet for smooth and uninterrupted flow of mud from the inlet to the outlet through said chamber, a first piston arranged in said first chamber adapted to close and open said inlet by slidable movement along the longitudinal axis of the first chamber into and out of contact with said seating surface, a piston arm connected to said first piston protruding through an opening in said wall member into said second chamber, said first piston and said piston arm being provided with a central bore communicating the first chamber ahead of said first piston with the second chamber for flow of mud into said second chamber on movement of said first piston to close the inlet, a second piston in said second chamber having a working area greater than the working area of the first piston rigidly mounted on said piston arm intermediate its ends, a third piston in said second chamber on the side of said second piston remote from said first piston and in slidable free relationship to said second piston having a working area greater than the working area of the first piston, and separate means for supplying clean operating fluid to the opposite ends of said second chamber to move said second piston to the right and to move said second and third pistons to the left and thereby opening and closing said inlet by actuation of said first piston.

3. A mud valve which comprises a housing provided with a wall member defining with said housing first and second chambers having an inlet and an outlet for said first chamber, an annular seating surface provided by said housing in said first chamber between the inlet and outlet, said inlet having a common longitudinal axis with said first chamber and said outlet being arranged in said housing downstream from said seating surface and having its longitudinal axis perpendicular to the longitudinal axis of the inlet for smooth and uninterrupted flow of mud from the inlet to the outlet through said chamber, a first piston arranged in said first chamber adapted to close and open said inlet by slidable movement along the longitudinal axis of the first chamber into and out of contact with said seating surface, a piston arm connected to said first piston protruding through an opening in said wall member into said second chamber, said first piston and said piston arm being provided with a central bore communicating the first chamber ahead of said first piston with the second chamber for flow of mud into said second chamber on movement of said first piston to close the inlet, a second piston in said second chamber having a working area greater than the working area of the first piston rigidly mounted on said piston arm intermediate its ends, a third piston in said second chamber on the side of said second piston remote from said first piston and in slidable free relationship to said second piston having a working area greater than the working area of the first piston, a guide rod attached to said third piston slidably arranged in an exterior wall of said valve housing, and separate means for supplying clean operating fluid to the opposite ends of said second chamber to move said second piston to the right and to move said second and third pistons to the left and thereby opening and closing said inlet by actuation of said first piston.

4. A mud valve which comprises a housing provided with a wall member defining with said housing first and second chambers having an inlet and an outlet for said first chamber, an annular seating surface provided by said housing in said first chamber between the inlet and outlet, said inlet having a common longitudinal axis with said first chamber and said outlet being arranged in said housing downstream from said seating surface and having its longitudinal axis perpendicular to the longitudinal axis of the inlet and providing a leading sloping surface for smooth and uninterrupted flow of mud, a first piston arranged in said first chamber adapted to close and open said inlet by slidable movement along the longitudinal axis of the first chamber into and out of contact with said seating surface, a piston arm connected to said first piston protruding through an opening in said wall member into said second chamber, said first piston and said piston arm being provided with a central bore communicating the first chamber ahead of said first piston with the second chamber for flow of mud into said second chamber on movement of said first piston to close the inlet, a second piston in said second chamber having a working area greater than the working area of the first piston rigidly mounted on said piston arm intermediate its ends, a third piston in said second chamber on the side of said second piston remote from said first piston and in slidable free relationship to said second piston having a working area greater than the working area of the first piston, and separate means for supplying clean operating fluid to the opposite ends of said second chamber to move said second piston to the right and to move said second and third pistons to the left and thereby opening and closing said inlet by actuation of said first piston.

References Cited in the file of this patent

UNITED STATES PATENTS

| | | |
|---|---|---|
| 412,789 | Probert | Oct. 15, 1889 |
| 1,205,898 | Jones | Nov. 21, 1916 |
| 1,424,949 | Stork | Aug. 8, 1922 |
| 1,791,980 | Shea | Feb. 10, 1931 |
| 2,068,816 | Pratt | Jan. 26, 1937 |
| 2,542,390 | Brown | Feb. 20, 1951 |
| 2,575,934 | Timmerman | Nov. 20, 1951 |

FOREIGN PATENTS

| | | |
|---|---|---|
| 117,838 | Switzerland | of 1927 |